United States Patent [19]

Ortiz et al.

[11] Patent Number: 5,361,297
[45] Date of Patent: * Nov. 1, 1994

[54] METHOD AND APPARATUS FOR PROVIDING ANSWER SUPERVISION AND AN AUTONOMOUS PAY TELEPHONE INCORPORATING THE SAME

[75] Inventors: Luis R. Ortiz, San Juan; Alexis Torres; Angel Encarnacion, both of Carolina, all of Puerto Rico

[73] Assignee: Telular Corporation, Buffalo Grove, Ill.

[*] Notice: The portion of the term of this patent subsequent to Jul. 28, 2009 has been disclaimed.

[21] Appl. No.: 921,042

[22] Filed: Jul. 28, 1992

Related U.S. Application Data

[63] Continuation of Ser. No. 687,310, Apr. 18, 1991, Pat. No. 5,134,651.

[51] Int. Cl.5 .................... H04M 1/00; H04M 15/00
[52] U.S. Cl. .................................. 379/130; 379/132; 379/155; 379/59; 379/151
[58] Field of Search ............ 379/155, 112, 130, 132, 379/34, 251, 257, 352, 151, 63, 131, 59

[56] References Cited

U.S. PATENT DOCUMENTS

| | | | |
|---|---|---|---|
| 4,122,308 | 10/1978 | Weinberger et al. | 379/132 |
| 4,326,256 | 4/1982 | Furumoto | 379/59 X |
| 4,461,928 | 7/1984 | Hashimoto | 379/130 |
| 4,658,096 | 4/1987 | West, Jr. et al. | |
| 4,737,975 | 4/1988 | Shafer. | |
| 4,751,728 | 6/1988 | Treat | 379/131 X |
| 4,775,997 | 10/1988 | West, Jr. et al. | |
| 4,776,003 | 10/1988 | Harris. | |
| 4,777,647 | 10/1988 | Smith et al. | |
| 4,813,065 | 3/1989 | Segala | 379/112 |
| 4,890,317 | 12/1989 | Hird et al. | |
| 4,916,733 | 4/1990 | Smith et al. | |
| 4,920,562 | 4/1990 | Hird et al. | |
| 4,922,517 | 5/1990 | West, Jr. et al. | |
| 4,924,497 | 5/1990 | Smith et al. | |
| 4,926,468 | 5/1990 | Smith et al. | |
| 4,926,469 | 5/1990 | Smith et al. | |
| 4,937,862 | 6/1990 | Kosich | 379/130 |
| 4,953,198 | 8/1990 | Daly et al. | 379/63 |
| 4,972,457 | 11/1990 | O'Sullivan | 379/59 |
| 4,974,251 | 11/1990 | Ohta et al. | 379/63 |
| 5,046,085 | 9/1991 | Godsey et al. | 379/112 |
| 5,109,401 | 4/1992 | Hattori et al. | 379/131 X |
| 5,134,651 | 7/1992 | Ortiz et al. | 379/112 |
| 5,179,584 | 1/1993 | Tsumura | 379/130 X |

OTHER PUBLICATIONS

"Mitel MSAN-120 MT8880 DTMF Transceiver Applications" Jun., 1986.

*Primary Examiner*—Stephen Chin
*Assistant Examiner*—Paul Loomis
*Attorney, Agent, or Firm*—Milton S. Gerstein; Marvin N. Benn

[57] ABSTRACT

A method and apparatus for telephone call answer supervision, capable of detecting the completion of both national and international calls, which employ different answer confirmation formats, and provide confirmation that a placed call has been answered if least one of the following conditions occurs: 1) a tone of a given frequency, transmitted on the transmit line of a telephone, is detected as received back on the receive line; and 2) audio activity having a non-repetitive cadence is detected on both the transmit and receive lines of the telephone. Also provided is an autonomous pay telephone, such as a mobile telephone, which includes an arrangement for determining and accessing a call rate, per unit of time, for a call placed to a given telephone number, a display for displaying, in real-time as the call progresses, charges for a completed call as well as an accounting arrangement for storing charges accessed for each completed call.

14 Claims, 11 Drawing Sheets

METHOD AND APPARATUS FOR PROVIDING ANSWER SUPERVISION AND AN AUTONOMOUS PAY TELEPHONE INCORPORATING THE SAME

This is a continuation of application Ser. No. 07/687,310, filed on Jul. 28, 1992 U.S. Pat. No. 5,134,651.

BACKGROUND OF THE INVENTION

1. Field of the Invention

The present invention relates to both a method and apparatus for providing telephone answer supervision capable of detecting the completion of both national and international calls, which employ different answer confirmation formats, as well as to an autonomous pay telephone, such as a mobile telephone, incorporating the same.

2. Background Discussion

Conventional pay telephone service, which has generally been provided by major telephone companies, is becoming highly attractive to the private pay station owner as a result of the continuing deregulation of such service and associated equipment as well as due to the availability of various mobile radio communication methods and systems in addition to the traditional landline telephone systems now in service.

One important requirement for all telephone configurations, landline or mobile as well as pay or otherwise, is the ability to determine if a placed call has been answered, hereinafter referred to as answer supervision. This requirement is essential in order to determine when to charge the patron for a placed telephone call. In fact, due to the past failure to properly provide effective answer supervision, recent legislation passed by the U.S. Congress has codified the requirements for answer supervision in the United States.

Typically, the Central Office of the local telephone company detects when the called party lifts the handset creating an off-hook condition which completes an electric loop from the Central Office. The telephone company starts billing the call from the moment it detects the loop completion. This answer supervision information is passed on to inter-exchange carriers, i.e., AT&T, MCI, under what is called in the United States as Feature Group D interconnection. Other methods used for detecting when a call has been answered include: 1) voice detection, 2) ring cadence interruption detection plus busy cadence acknowledge, and 3) timing after last digit dialed.

Normally, the conventional landline pay telephone is provided with no answer supervision capability and is dependent on the Central Office equipment (compatible with the national format only) to detect a completed call. In this regard, once the Central Office detects a completed call, it generates standard tones or signals (momentary reversal of polarity or signal tones, such as at 12,000 Hz) which are detected by the pay telephone to indicate the completion of a call. In the case of telephone companies following the North America standards, the pay telephone is connected to special lines at the Central Office which have the necessary equipment to provide the answer supervision signalling to the pay telephone. In the case of telephone companies following the international CCITT/CEPT standards, the Central Office either follows a similar reverse polarity method of answer supervision signalling or sends the tones to signal that the called party has answered, together with the appropriate rate information. Further, special circuits are generally provided at the Central Office that briefly reverse polarity of the line so that the pay telephone can collect deposited money once the Central Office detects the completed call.

In the case of customer owned pay phones (COCOT) or in the case of PBX, key systems, or even in the early days of MCI and US Sprint, the Central Office does not send any signal to the calling party indicating when the call has been answered. Therefore, the above-noted methods of answer supervision have been used with various algorithms to try and improve their inherent shortcomings. False answer detection or no detection when a call is really answered, resulting in erroneous charges or no charges at all, are the consequences of inexact answer supervision.

U.S. Pat. No. 4,916,733 discloses a telephone call answer supervision apparatus which employs the ringing cadence interruption detection method wherein the answer supervision signal received from the Central Office is employed to detect when the call is answered using the U.S. standard tone specs only. This arrangement measures the timing cadence of tones received and uses them as a reference for detecting a call. However, if a call is made to a country with a different timing cadence, this arrangement cannot recognize and differentiate the tones one from another because no provision is made to identify them.

U.S. Pat. Nos. 4,777,647, 4,924,497, 4,926,468 and 4,926,469 disclose pay telephone interface circuits for coupling a conventional pay station telephone to a telephone switching system. In this particular arrangement, the interface provides supervision signal detection functions normally provided by the switching system and thus can be connected thereto by a less costly business line.

U.S. Pat. No. 4,920,562 discloses an arrangement which can locally generate records of individual telephone calls to facilitate the billing of collect calls and calls placed using credit cards and other billing access formats on a pay telephone station. The station records the duration of the call and other pertinent information in a billing record for later retrieval to prepare the billing of the call. However, no provision is made for displaying the cost of the call in real time. Additionally, U.S. Pat. No. 4,890,317 similarly relates to an arrangement for locally generating records of individual telephone calls and includes an arrangement for determining the validity of the billing account number by attempting to place a telephone call using the billing account number to a controlled telephone number.

U.S. Pat. Nos. 4,658,096, 4,737,975, 4,775,997 and 4,922,517 all disclose cellular phone interface arrangements for providing a connection to adapt a standard telephone set with a radio transceiver. However, such an arrangement would suffer from the disadvantages noted above in that dependence on the traditional telephone landline systems is required when placing a call using such an arrangement.

Also known is a cellular mobile telephone credit card system such as disclosed, for example, by U.S. Pat. No. 4,776,003, in which the cellular pay station, from the viewpoint of the serving cellular carrier facility, is indistinguishable from standard cellular mobile stations. In this arrangement, the activities of the credit card station are supported by an administrative processor which is connected to a standard telephone line of the public switching telephone network. Data messages are exchanged therebetween and used to establish operating options, compilation of records for assignment of billing responsibility to transient customers and control of the stations for administrative and commercial reasons. As with the previously discussed pay telephone arrangements, the unit operates in dependence on the Central Office signaling scheme.

Because of the unique nature of a pay telephone using a mobile telephone installed, for example in a vehicle, special provisions are required for autonomous operation control in the areas of tariffing, call generation and accounting, called party detection, i.e., answer supervision, as well as accessing the cost of the service to a user. In view of the foregoing, it is highly desirable to provide mobile pay telephone equipment capable of accepting, on site, different tariffing formats as well as having the capability of detecting any type of national and international answer supervision confirmation. Because mobile pay telephone equipment operates in the radio environment, and therefore is highly mobile, it is also desirable that such an arrangement operate independently from the Central Office signaling scheme by providing a reliable interface with the particular radio receiver and autonomously generate the necessary supervisory signals required to operate with the telephone network.

SUMMARY OF THE INVENTION

One object of the present invention is to provide a method and apparatus for reliable answer supervision which is capable of detecting the completion of both national and international call which employ different answer confirmation schemes.

Yet another object of the present invention is to provide an autonomous pay telephone arrangement for processing a pay telephone call from, for example, a mobile telephone without the need for credit cards and in manner which eliminates reliance on the telephone company's Central Office for either answer supervision or billing.

Therefore, according to preferred embodiments of the present invention, these and other objects, advantages and features are achieved by a method for providing call answer supervision to determine if a placed call to a given telephone number has been answered by a called party at the given telephone number, the method comprising the steps of: transmitting a tone of a given frequency on a transmit line of a telephone; monitoring a receive line of the telephone to determine if the tone is received back on the receive line; simultaneously monitoring the transmit and receive lines to determine the presence of other audio activity; determining if the other audio activity, present on the receive line, has a repetitive cadence; and determining that the placed call has been answered if at least one of the following conditions occurs: 1) the tone of the given frequency is received back on the receive line; and 2) audio activity having a non-repetitive cadence is detected both on the transmit and receive lines of the telephone.

According to preferred embodiments of the present invention there is provided an apparatus for providing call answer supervision to determine if a placed call to a given telephone number has been answered by a called party to the given telephone number, the apparatus comprising: tone generating means for transmitting a tone of a given frequency on a transmit line of a telephone; tone detection means for monitoring a receive line of the telephone and for determining if the tone is received back on the receive line; audio activity detection means for simultaneously monitoring the transmit and receive lines for the presence of other audio activity; cadence determining means for determining if the other audio activity, present on the receive line, has a repetitive cadence; and answer confirmation means for determining that the placed call has been answered if at least one of the following conditions occurs: 1) the tone of the given frequency is detected as received back on the receive line by the tone detecting means; and 2) audio activity having a non-repetitive cadence is detected both on the transmit and receive lines of the telephone by the cadence determining means.

One advantageous feature of preferred embodiments of the present invention is the provision that the answer supervision method and apparatus eliminate the requirement for pre-identification of a specific country's ring back signal, the method being applicable to any telephone arrangement, i.e., landline telephones connected to a standard telephone network as well as a radio-linked base communication arrangements, such as a mobile telephone.

According to further embodiments of the present invention there is provided an arrangement for providing an autonomous pay telephone comprising: a memory for storing call rate information for determining a rate to be charged per unit of time for a call to a given telephone number; charging means for receiving the telephone given number and for determining the rate to be charge for a call placed to the given number from the call rate information stored in the memory; and display means for displaying, in real-time as the call progresses, charges for the call placed to the given telephone number upon completion of the placed call to the given telephone number.

Advantageous features of the autonomous pay telephone arrangement include the provisions that the cumulative charges of each call placed or received are continuously displaying, in real-time, so that the user is advised of the cost during the telephone call, and that a telephone equipped with the autonomous pay telephone arrangement is programmed, by the owner or service provider, for different rates for billing purpose as well as to obtain access to charged amount totals for accounting purposes.

By being able to control the tariffs and charges for services provided, the owner or service provider can establish the desired mark-up without having to depend on others. Further, the ability to obtain charged amount totals provides a reliable method for auditing money collections relating to the use of such a telephone arrangement.

Thus, the autonomous pay telephone arrangement of the present invention envisions providing accurate pay telephone service in locations previously unavailable. When the autonomous pay telephone arrangement is applied to a mobile telephone provided in a taxi or other for-hire vehicles, such as rental cars, buses and trains, patrons can place pay telephone calls while traveling and will be billed instantaneously and accurately for the service used.

This arrangement not only allows the owners of such for-hire vehicles to enhance their service and profitability, but also provides a reliable method for verification of cash money collected from the use of such mobile telephones by providing retrieval of all call records and cost information from a specific vehicle unit so that a final report, for a specific period, can be generated immediately at the end of a given work period.

In operation, the autonomous pay telephone arrangement of the present invention envisions payment in cash for services received at the end of a placed or received telephone call or upon return of a rental vehicle so equipped.

Another advantageous feature of the autonomous pay telephone arrangement is that it interfaces directly with the audio circuitry of a mobile telephone, such as, for example, a cellular telephone, which results in a stand-alone product considerably cheaper to produce than prior art arrangements.

The arrangement can be provided options for operation with any type of full duplex conventional and trunked radios, and radio telephone transceivers including cellular transceivers compatible with the cellular format such as: AMPS, NMT 450, NMT 900, TACS, E-TACS as well as with options for interpreting the tariffing signals, in the case of some NMT systems and in E-TACS systems, normally sent by the mobile telephone switch (MTX) applying the corresponding call rate charge.

DETAILED DESCRIPTION OF THE PREFERRED EMBODIMENTS

Figure 1:
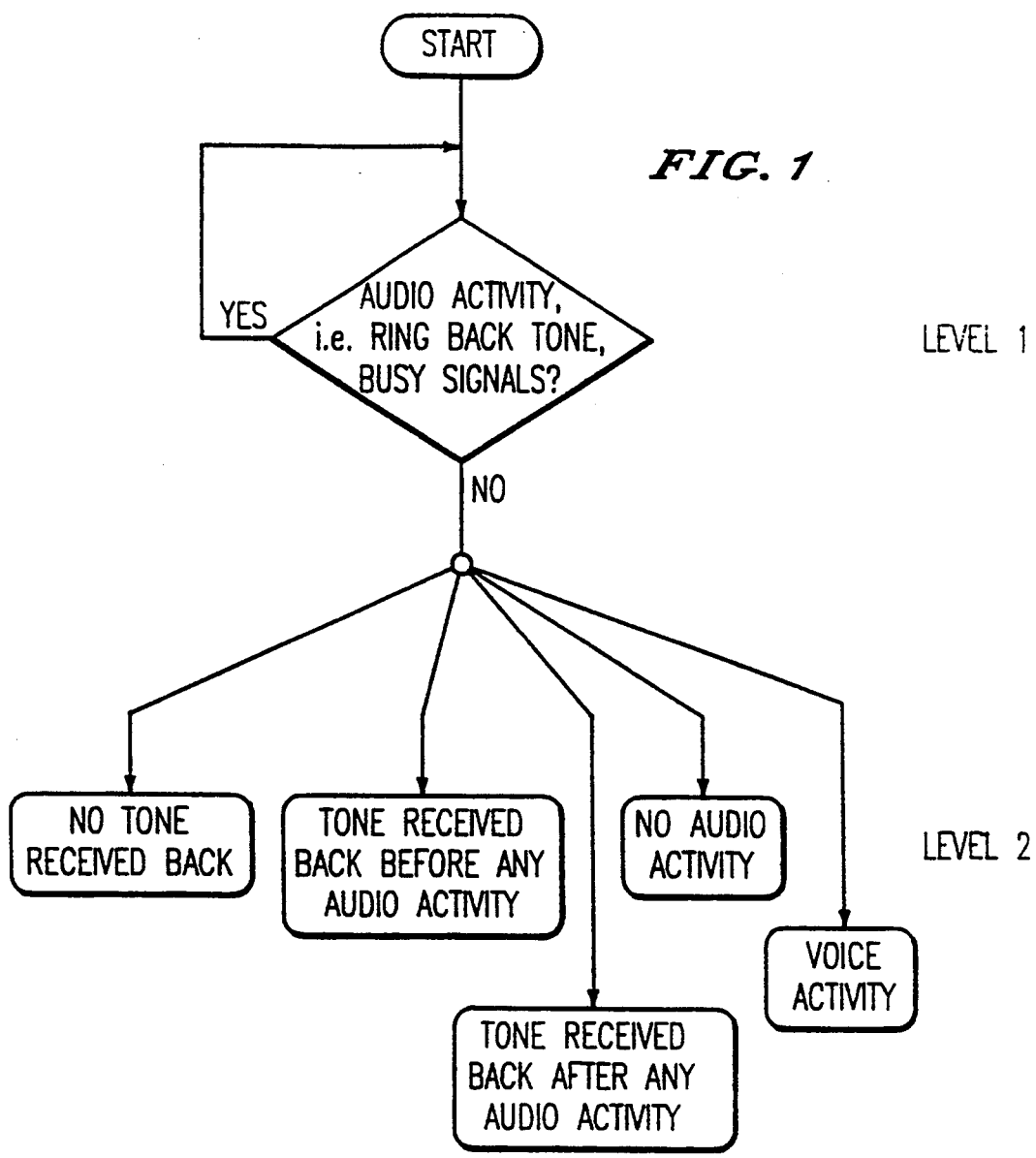
FIG. 1 is a call progress detection flow diagram illustrating the operation of the answer supervision method of the present invention.

The answer supervision method of the present invention, which can be universally applied to any telephone, mobile, landline or otherwise, for use in answer supervision to detect the completion of local, national, and international calls routed through different communication media, simultaneously utilizes sequential audio signal comparison supervision and tone answer supervision to determine when a call party has answered. This dual answer supervision provides a high level of reliability in determining the completion of a placed call.

The sequential audio signal comparison supervision is employed to verify that the same signal, i.e., busy signal, ring back signal, repetitive audio activity or the like, is being received in response to a placed call, in which case, an indication is provided that the placed call has not been answered. If, during the comparison process, the audio signal received shows an irregular timing cadence, as in the case of a voice signal, an indication is provided that the call has been answered by the called party or an automatic network intercept message.

The tone answer supervision, simultaneously conducted with the sequential audio signal comparison supervision, is also employed to detect if the call has been answered. A special tone, in the audio range, is sent through the transmit line and the receive line is monitored to check if the pulse is received. If the tone is received back, it triggers the answer supervision circuit, indicating that the phone line is closed and the call has been answered.

This tone answer supervision is employed because the telephone circuit, between the Central Office and the telephone subscriber who is being called, typically consists of a two wire loop which is open when the subscriber's telephone is on the hook. When the call party answers the telephone, i.e., the receiver is taken off the hook, the circuit between the Central Office and the subscriber's telephone is completed which not only allows for conversation to go through, but also permits the return of the tone generated and employed by the tone answer supervision.

The combination of the sequential audio signal comparison supervision and the tone answer supervision provides a fail-safe way of detecting an off-hook condition because calls erroneously placed to the Central Office, which result in the receipt of a recorded announcement, do not trigger a false answer signal even though the sequential audio signal comparison supervision will detect a voice signal because, in most cases, there is no two wire closed loop, four line trunk circuits being employed to connect the recorded announcement machine, and the method of the present invention takes this into account as will become more apparent as the following detailed description proceeds.

In operation, after a call is generated, the answer supervision method will start to send a precise audio pulse of, for example, about 2,100 Hz for a maximum of about 1 second, and will check to see if the tone is received back. The 2,100 Hz tone disables the echo canceling equipment in the telephone network, making it possible for the tone signal to be detected back when the loop is closed. If the tone is not received back, the tone will continue to be sent ever 2 seconds or so, until the call is terminated or answered by the called party or an automatic network intercept method.

If the tone is received back before any audio activity is detected, a flag will be set to indicate receipt of the tone, and the tone will not be sent again. Alternatively, if voice activity is detected by the sequential audio signal comparison supervision, the method will not send the tone again and a flag will be set which indicates that the tone was not received back. After voice activity is detected, the method will check to see if the calling party answers to the called party. If the called party does answer to the calling party, the method checks to see if the tone was received back. If the tone was received back, a grace period of, for example, 6 seconds, will be given before starting to charge the call to see if there is a disconnect. If the tone was not received back and the calling party answers to the called party, a grace period of, for example, 10 seconds, will be given before starting to charge the call to prevent false answer supervision. If the tone is received back after any audio activity is detected, then the system will start to charge the call immediately.

Referring to FIG. 1, a call progress detection flow diagram, illustrating the operation of the answer supervision method of the present invention, is illustrated which sets forth the control levels for the sequential signal comparison answer supervision and tone answer supervision. In this regard, the method remains at control level 1, waiting for the called party to answer, if sequential audio activity, such as ring back tone or busy signals are received. However, if any other condition occurs, such as some combination of no tone received back, tone received back before any audio activity, tone received back after any audio activity, no audio activity, voice activity, the method proceeds to control level 2 as will be more fully described with particular reference to FIGS. 2A–2C.

Figure 2C:
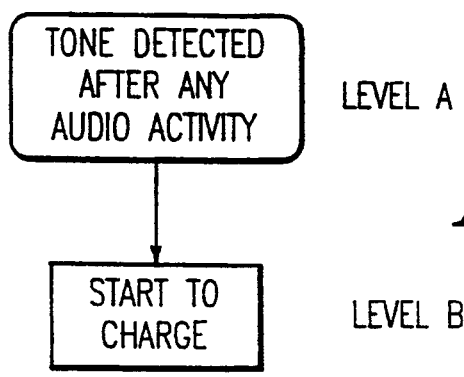
FIGS. 2A-2C are block diagrams illustrating the answer supervision hierarchy for integrating the sequential audio signal comparison supervision and tone answer supervision of the answer supervision method of the present invention.
Figure 2A:
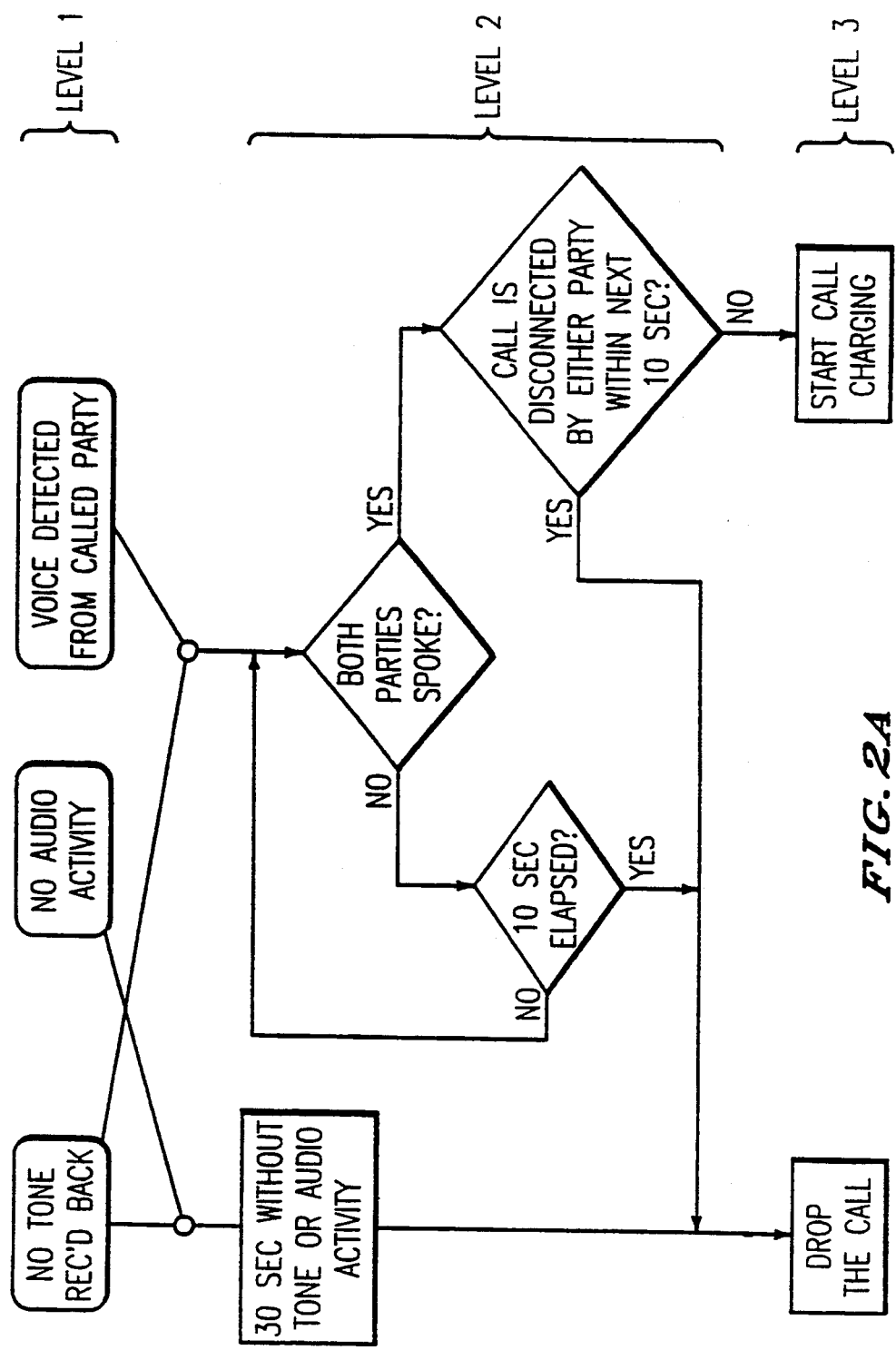
Figure 2B:
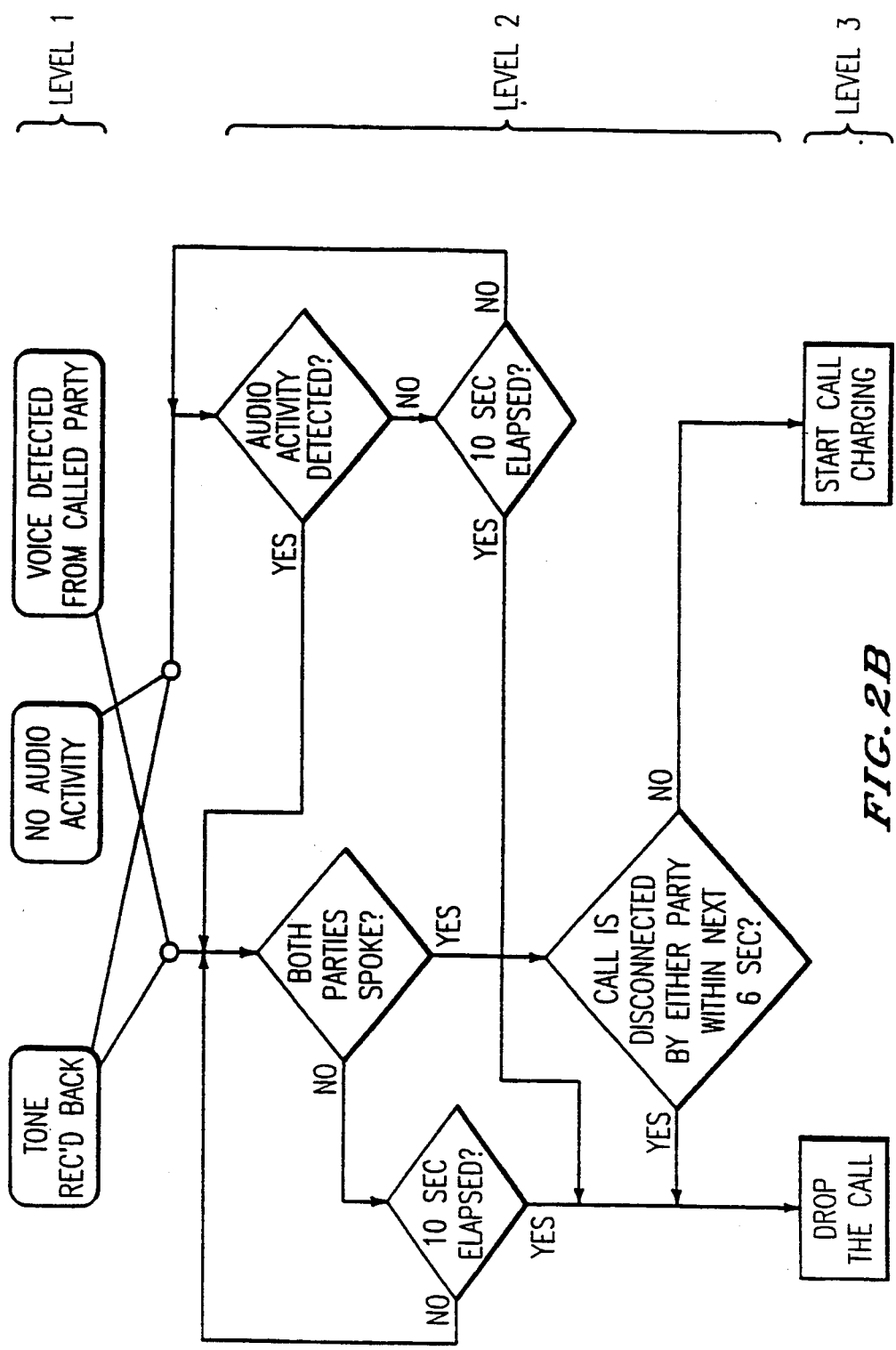

FIGS. 2A–2C illustrate the answer supervision hierarchy provided at control level 2 of the answer supervision method of the present invention. Referring to FIG. 2A, at level A of control level 2, if no tone is received back and no audio activity is received during a predetermined period of time, for example, 30 seconds, the method proceeds to level C and drops the call. Additionally, at level A, if no tone is received back and voice activity is detected, the method proceeds to level B and determines if both parties have spoken, i.e., the calling party answers to the called party. If this action does not occur within a predetermined period of time, for example, 10 seconds, the method proceeds to level C and drops the call.

If, however, the calling party answers to the called party, the method waits for a predetermined period of time, for example, 10 seconds, to see if a disconnect occurs within the 10 second period. If disconnect does occur during this waiting period, the method proceeds to level C and drops the call. If, however, a disconnect does not occur within the predetermined period of time, then the method proceeds to level C and starts charging the call.

Referring to FIG. 2B, at level A of control level 2, if the tone is received back and no audio activity is detected, the method proceed to level B and waits for some audio activity to be detected within a predetermined period of time, for example, 10 seconds. If no audio activity is detected, the method proceeds to level B and drops the call.

If, at level A, a tone is received back before any audio activity and audio activity is then detected from the called party, the method proceeds to level B to check if the calling party answers to the called party, i.e., both parties have spoken. If no answer is received within at predetermined period of time, for example, 10 seconds, then the method proceeds to level C and drops the call. If an answer is detected, the method waits a predetermined period of time, for example, 6 seconds and checks if a disconnect occurs. If a disconnect does occur, the method proceeds to level C and drops the call. However, if no disconnect occurs, the method proceeds to level C and starts to charge the call. Referring to FIG. 2C, at level A, if the tone is received back after the audio activity is detected, then the method proceeds to level B and starts to charge the call.

The sequential audio signal comparison supervision of the method of the present invention will now be described with particular reference to FIGS. 3A–3E. It should be noted that the sequential audio signal comparison supervision of the present invention is employed to detect the irregular cadence of voice signals as is best illustrated by the examples provided below and the following detailed description.

Figure 3A:
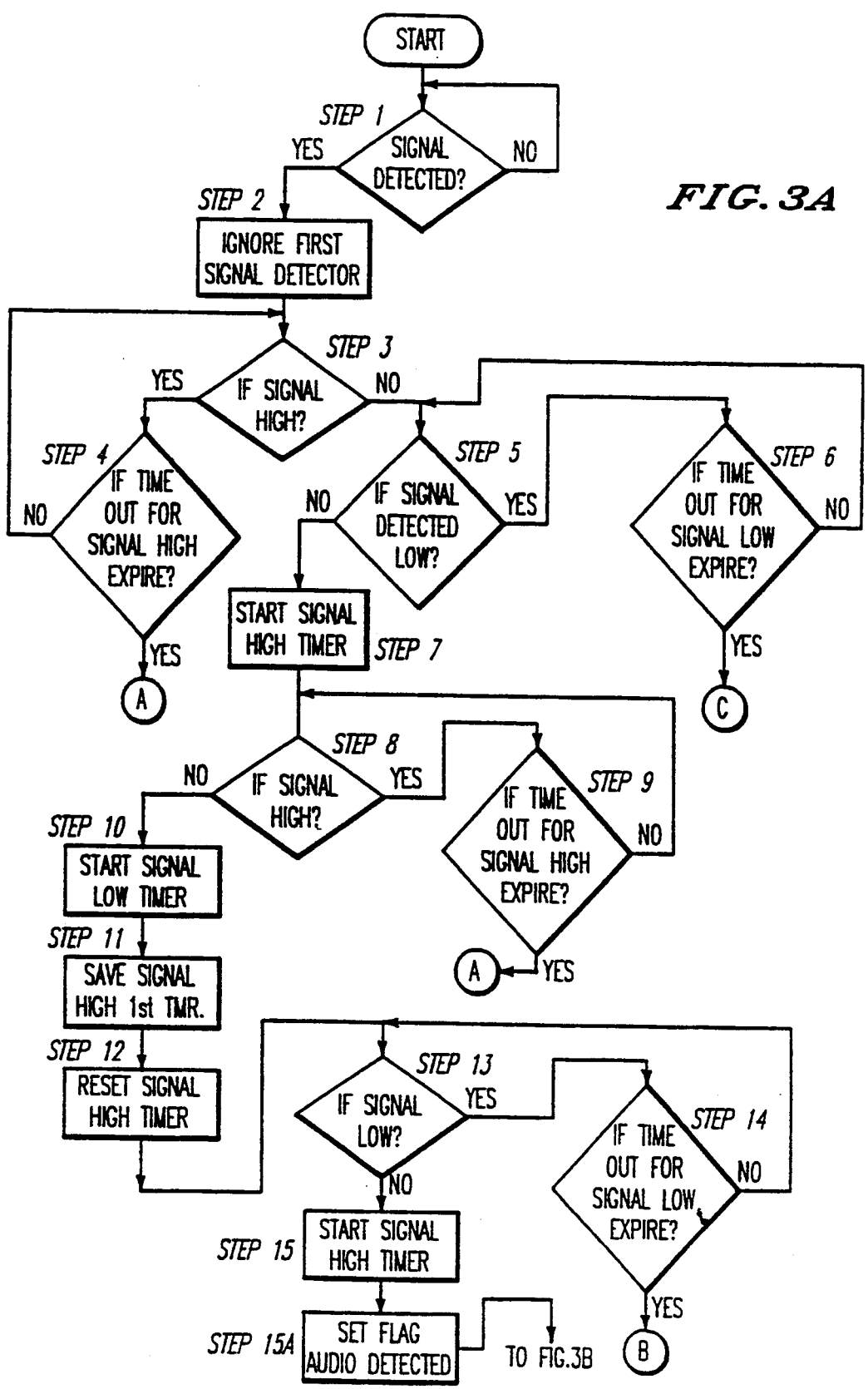
FIGS. 3A-3E are block diagrams illustrating the sequential audio signal comparison supervision of the answer supervision method.
Figure 3B:
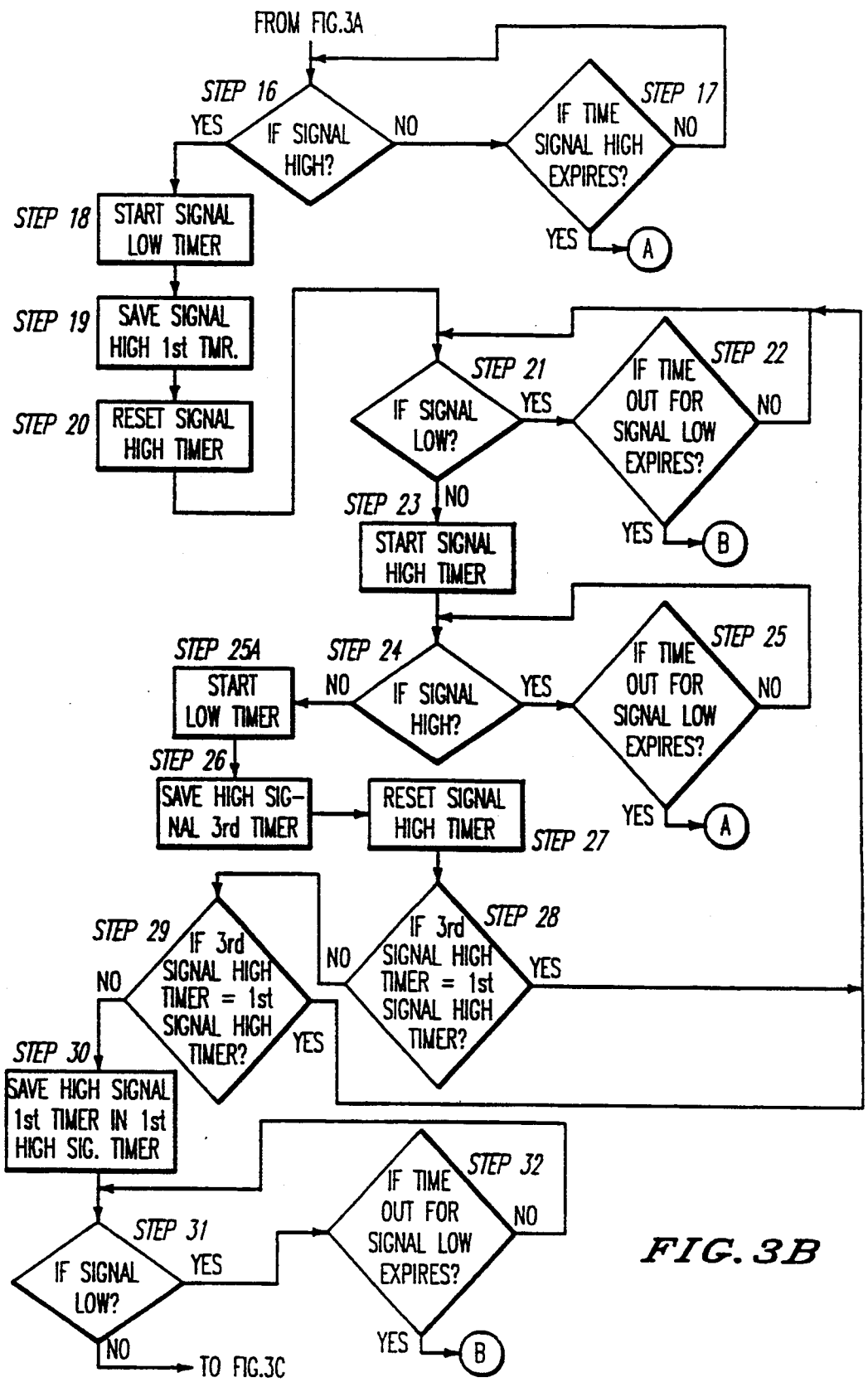
Figure 3C:
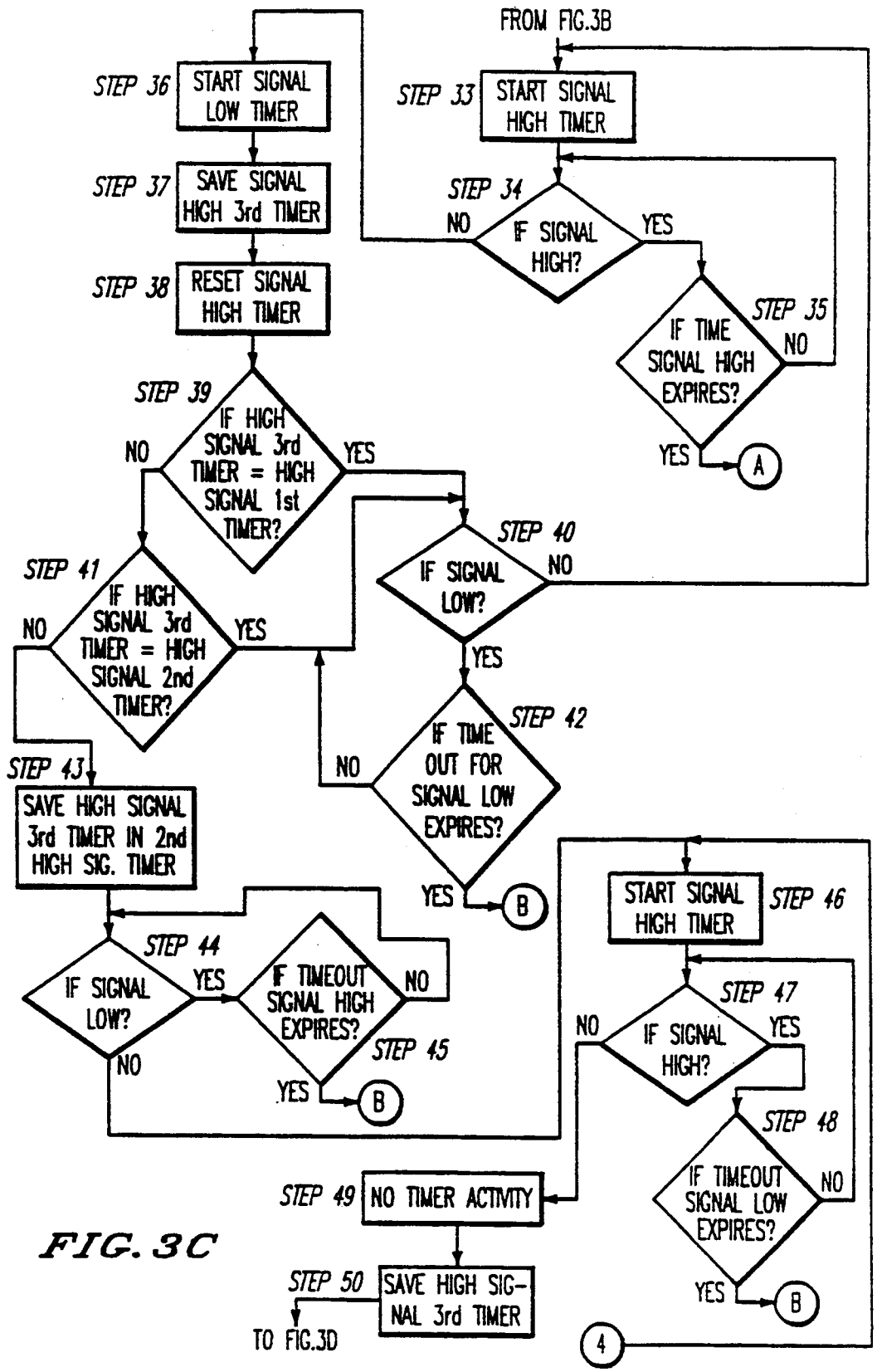
Figure 3D:
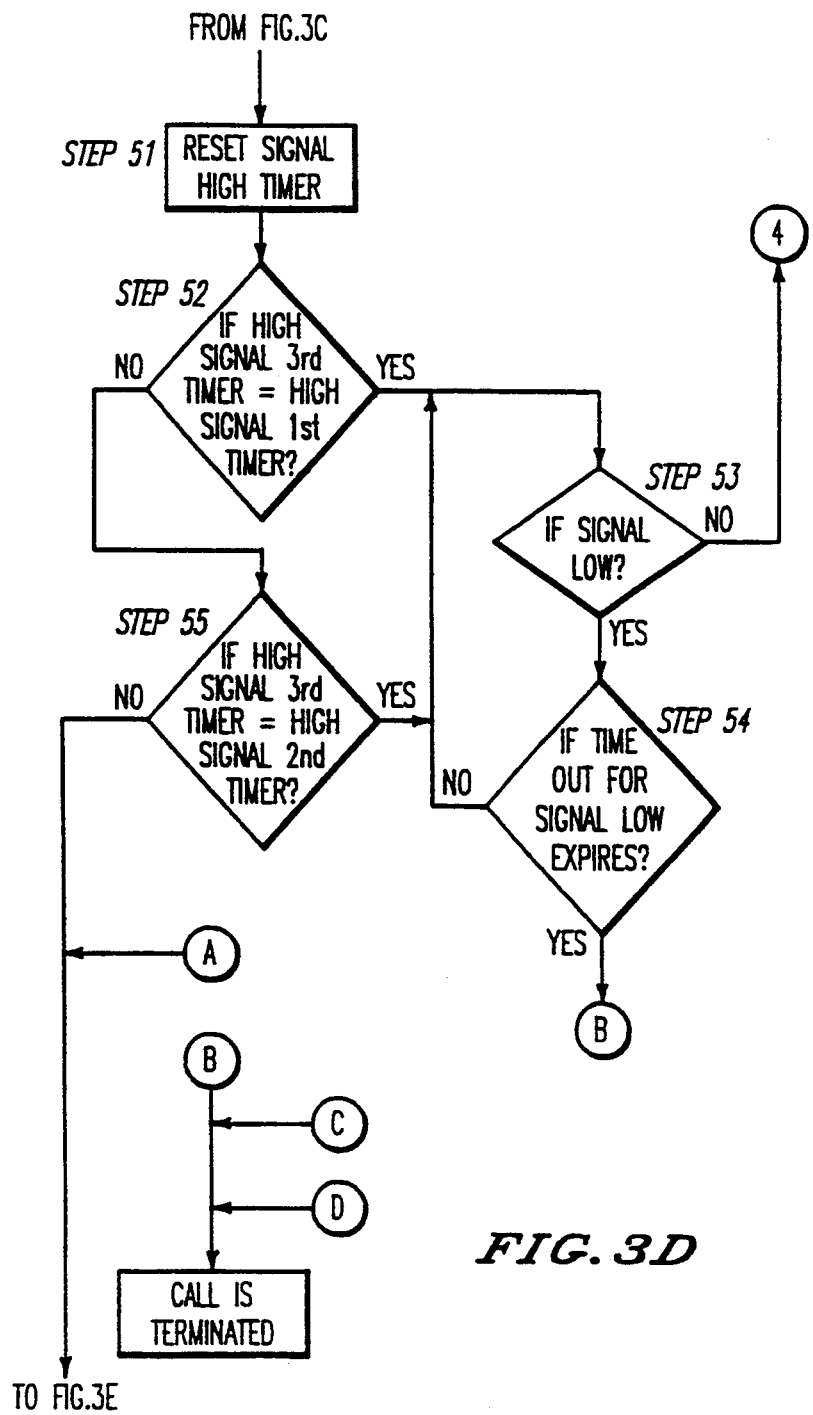
Figure 3E:
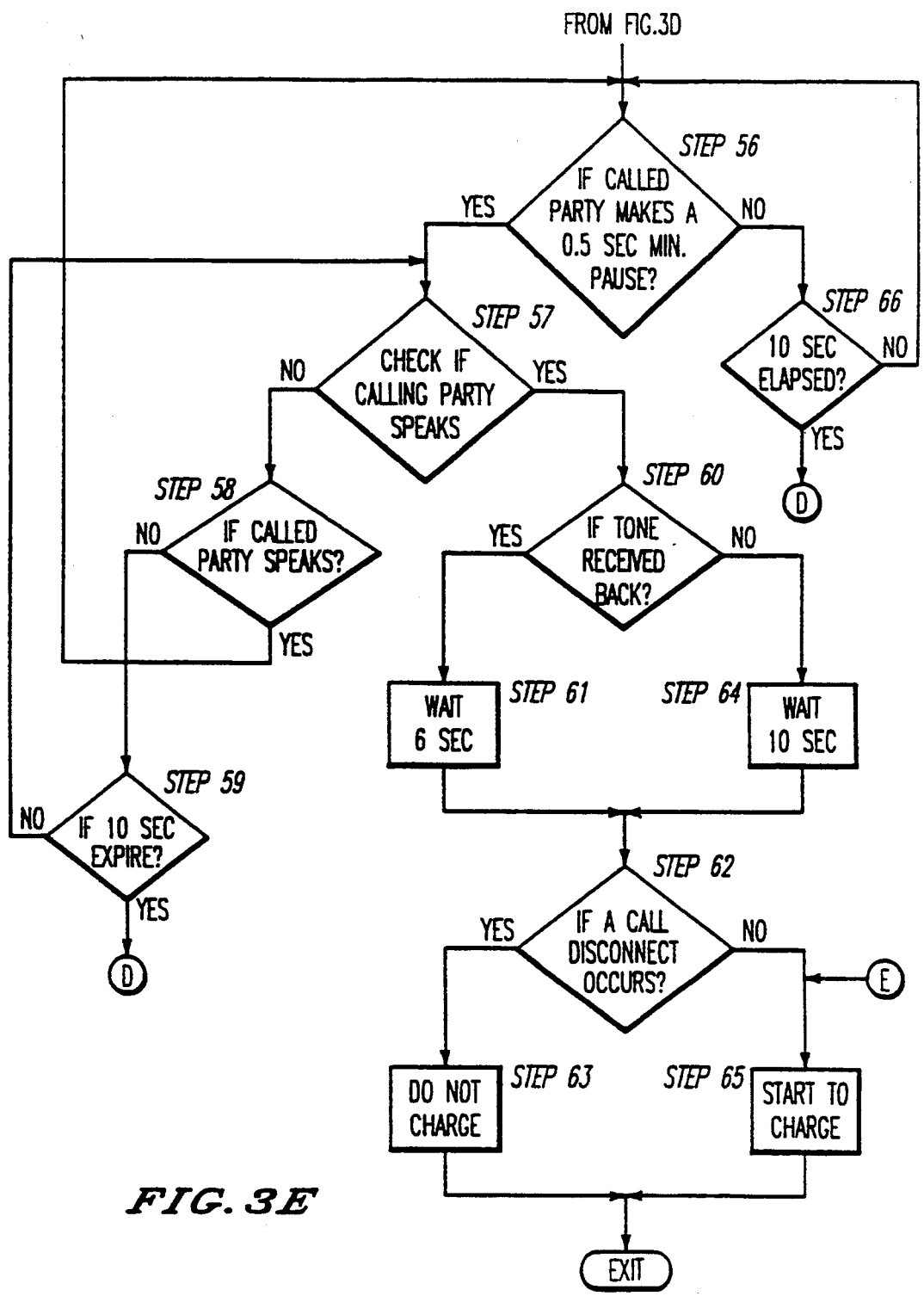

Referring to FIG. 3A, in step 1, after a call has been initiated, the method waits for the first audio activity to be received over the telephone line. In step 2, upon detection of an audio signal, this first audio signal is ignored because the first audio signal received oftentimes does not have a complete cadence.

In step 3, the method continues checking the line to determine when the audio activity has stopped. However, if the audio activity remains for more than, for example, 10 seconds, as determined at step 4, the method proceeds directly to step A (see FIGS. 3D–3E). However, if the audio activity ends before the expiration of the predetermined period, the method returns to step 3, and because the audio activity has stopped, proceeds to step 5 to check to see if further audio activity is detected. In step 6, if no activity is detected for more than a predetermined period of time, for example, 20 seconds, the method will proceed directly to step C and drop the call (see FIG. 3D).

If, however, audio activity is detected in step 5, the method proceeds to step 7, and a timer (high timer) for activity detection is started. In step 8, the method waits until the activity finishes and, if the activity remains for more than 10 seconds, as determined in step 9, the method proceeds directly to step A. However, if this is not the case, when the audio activity ends, the method, in step 10, starts the timer for no activity (low timer), and in step 11, saves the duration of time of the audio activity measured by the high timer (first timer measurement) in, for example, a first register or any suitable data storage arrangements, for later reference and use as will be describe hereinafter.

In step 12, the method resets the high timer for further audio activity duration measurement. In step 13, the method checks for further audio activity on the line but, if no activity is detected for more than 10 seconds, as determined in step 14, the method jumps directly to step B (see FIG. 3D). However, if audio activity is detected, the high timer for audio activity duration measurement is started again in step 15. In step 15 A, a flag is set to indicate that audio activity has been detected.

In step 16, the method continues checking for the presence of the detected audio activity and, if the audio activity remains for more than a predetermined period of time, for example, 10 seconds, as determined in step 17, jumps directly to step A. If the detected audio activity finishes before the expiration of the predetermined period of time, the timer for no activity detection, i.e., low timer, is started in step 18. In step 19, the duration of time the audio activity measured by the high timer (second timer measurement) is saved in, for example, a second register and in step 20, the high timer is reset for further activity.

In step 21, the method checks to see if audio activity is present on the line and, in step 22, if no activity is detected for more than a predetermined period of time, for example, 10 seconds, the method proceeds directly to step B. However, if activity has been detected, the high timer for activity detection is started again in step 23. In step 24, the method continues to check for the present of the audio activity and in step 25, if the activity remains for more than a predetermined period of time, for example, 10 seconds, the method jumps directly to step A.

If the audio activity ends before the expiration of the predetermined period of time, the low timer for no activity is started in step 25A and in step 26, the duration of the audio activity measured by the high timer (third timer measurement) is saved, in, for example, a third register or the like, and in step 27, the high timer is reset. In step 28, the third timer measurement is compared with the first timer measurement, for example, by comparing the contents of the first register with the contents of the third register, to check to see if it is the same signal, i.e., the first and third timer measurements are equal, and if it is the same signal, the method proceeds back to step 21.

However, if it is not the same signal, the third timer measurement is compared with the second timer measurement in step 29, for example, by comparing the contents of the third register with the contents of the second register, and if both timer measurements are the same, the method proceeds directly back to step 21. If the timer measurements are different, in step 30, the third timer measurement replaces the first timer measurement, for example, by replacing the contents of the first register with the contents of the third register and the method waits for further activity in step 31.

If no activity is detected for more than 10 seconds, as determined in step 32, the method will proceed directly to step B. If audio activity is detected, the high timer is activated in step 33 and if the audio activity remains for more than, for example, 10 seconds, as determined in step 35, the method proceeds directly to step A. If the audio activity finishes before expiration of this 10 second period, the method proceeds to step 36 to activate the low timer. In step 37, the activity duration measured by the high timer is saved in, for example, the third register as the third timer measurement, and in step 38, the timer high for audio activity detection is reset.

In step 39, the timer measurement stored in the third register is compared with the timer measurement in the first register and if both timer measurements are the same, the method proceeds to step 40. If the first and third timer measurements are not the same, the third timer measurement will be compared with second timer measurement in step 41. If the second and third timer measurements are the same, the method proceeds to step 40. In step 40, the method checks for audio activity on the line and jumps to step 33 upon detection of such audio activity. However, if no audio activity is detected for more than 10 seconds (step 42), the method proceeds directly to step B.

In step 41, if the second timer measurement and the third timer measurement are not the same, the method proceeds to step 43 and the third timer measurement stored in the third register will be saved as the second timer measurement stored in the second register. The method waits, in step 44 for further audio activity on the line and, if no audio activity is detected for more than 10 seconds in step 45, the method proceeds directly to step B.

If audio activity is detected in step 44, the high timer for measuring the duration of the audio activity is started in step 46 and in step 47, the method continues checking for the detected audio activity. In step 48, if audio activity is present for more than, for example, 10 seconds, the method proceeds directly to step A. If the audio activity ends before the expiration of this predetermined period of time, in step 49, the low timer for measuring the duration of no activity is started and in step 50, the count of the high timer is saved in the third register as the third timer measurement.

Thereafter, in step 51 the high timer is reset. In step 52, the contents of the third register, i.e., the third timer measurement, is compared with the contents of the first register, i.e. the first time measurement and if they are the same, the method proceeds to step 53. In step 53, the method waits for further audio activity and if more audio activity is detected, it will proceed to step 46. If no audio activity is detected for more than, for example 10 seconds, as determined in step 54, the method proceeds directly to step B.

If, however, the content of the third register, i.e. the third time measurement, is not the same as the content of the first register, i.e, the first timer measurement, as determined in step 52, the system compares the contents of the second and third register in step 55. If both the second and third timer measurements are the same, the method proceeds back to step 53, but if both timer measurements are different, the method proceeds to step 56.

In step 56, the method verifies if the called party makes a pause of 0.5 seconds, i.e., no audio activity for the stated time period. If a pause of at least 0.5 seconds is detected, the method proceed to step 57 and verifies if the calling party speaks to the called party and if not, the method proceed to step 58 to determine if the called party has spoken.

In step 58, if the called party does not speak, in step 59, the method will verify if a predetermined time period of, for example, 10 seconds, has expired in which no one has spoken and if so, the method proceeds to step D and disconnects the call. However, if audio activity is detected prior to the expiration of this predetermined period, the method proceeds back to step 57 to see if the calling party speaks.

In step 58, if the called party has spoken, the method proceeds to step 56 and will again check if a 0.5 second pause has occurred. In step 56 if, after the expiration of a predetermined period of for example 10 seconds the method proceeds to step D in step 66 and disconnects the call. In step 57, if the calling party speaks to the called party, the method proceeds to step 60 to check to see if a tone has been received back as will be more fully described hereinafter with particular reference to FIG. 4.

If the tone has been received back the method proceeds to step 61 and waits 6 seconds before proceeding to step 62 to check to see if a disconnect has occurred. In step 63 if a disconnect has occurred, no charge is made. In step 60, if the tone has not been received back, the method waits 10 seconds in step 64 before checking, in step 62, for a disconnect. In step 65, if no disconnect has occurred, the method starts to charge in step 65.

Figure 4:
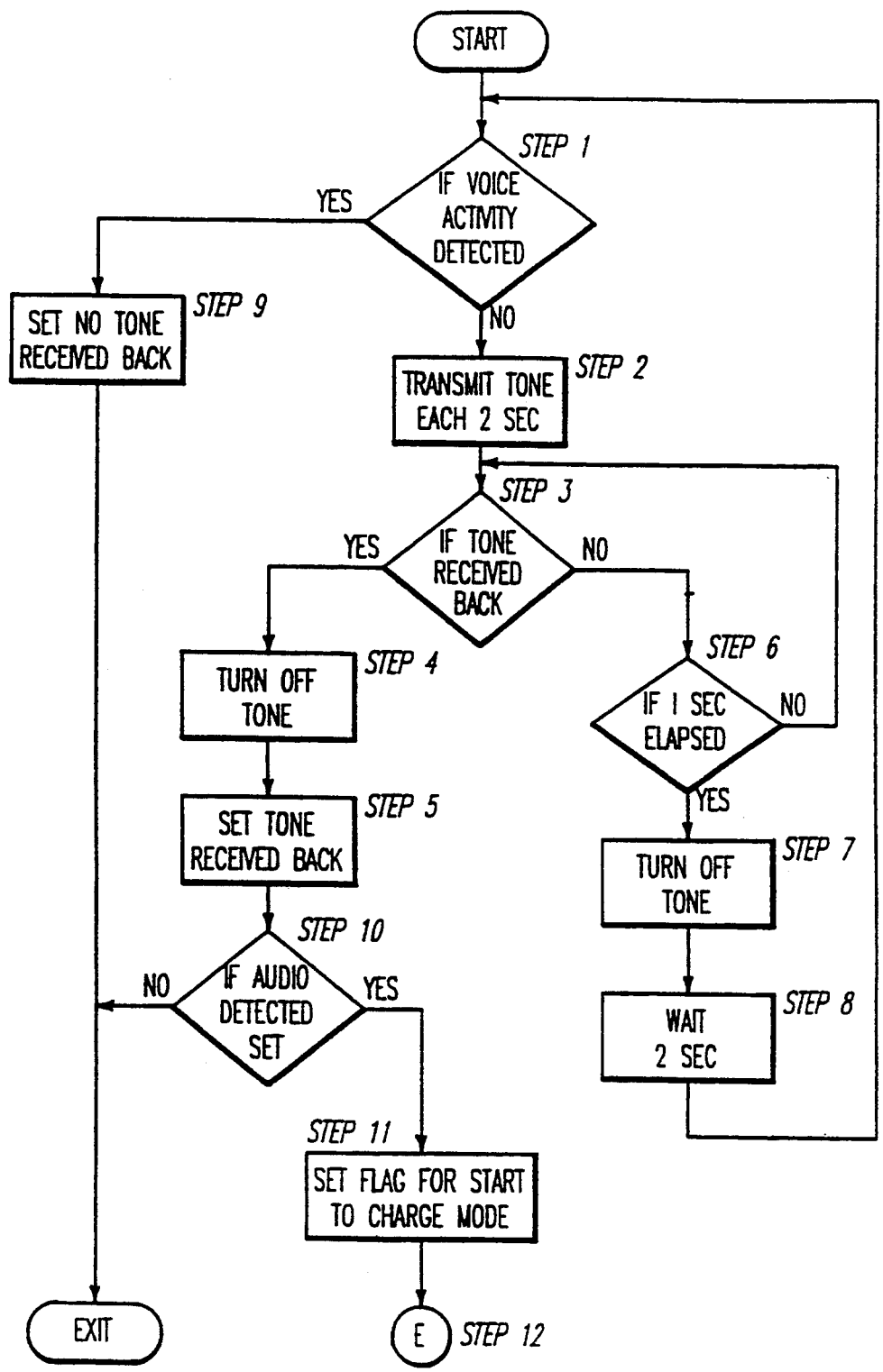
FIG. 4 is a block diagram illustrating the tone answer supervision of the answer supervision method.

Referring to FIG. 4, the tone answer supervision method is illustrated. In step 1, a determination is made, using the sequential audio activity supervision, to determine if voice activity has already been detected and if audio activity is detected, a flag is, preferably, set to indicate that an audio received back status has been set. If no voice activity is detected, a 2.1 KHz tone is transmitted every 2 seconds in step 2 and the method checks if the tone is received back in step 3. If the tone is received back, that indicates that the current loop has been closed and the method proceeds to turn off the toner generator in step 4 and set the tone received back status in step 5. If audio activity was detected before the tone was received back, the presence of the audio detected status, i.e., the presence of the flag set in step 1, is determined in step 10, and in step 11 a flag is set to indicate that the call has been answered and confirmed by tone back detection only. The method will then jump to step 65 (FIG. 3E) as indicated by the symbol E in step 12 of FIG. 4.

If no tone is received back in step 3, the method proceeds to step 6 and retransmits the tone for one second which is turned off at the end of the 1 second period in step 7. The method then waits for 2 seconds in step 8 before proceeding back to step 1 to retransmit the tone. If activity is detected in step 1, then, in step 9, a no tone received back flag is set and unless a tone is received bach and detected, the method exits tone answer supervision.

EXAMPLE

The following is a first example on how the answer supervision would interpret a ring back tone (U.S. 2 sec. on, 4 sec. off) followed by a busy tone (0.5 sec on/off). Although a signalling change occurs during the sequence, the answer supervision method is able to adapt and provide the proper status. The second example shows how a foreign country signalling plan will be interpreted by the answer supervision. The second sequence represents a call placed in the country of Malta where the ring back tone has a cadence of 0.225 sec. on, 0.525 sec. off, 0.4 sec. on, and 0.3 sec off. After ringing a couple of times, the call has been answered therefore the answer supervision is triggered.

FIRST EXAMPLE

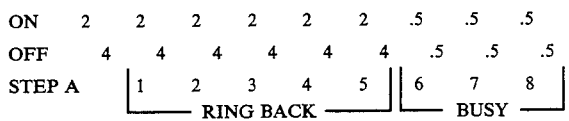

STEP A—The first signal will always be ignored.
STEP 1—Timer 1=2 sec.
STEP 2—Timer 2=2 sec.
STEP 3—Timer 3=2 sec.; Compare Timer 3 with Timer 1, they are the same.
STEP 4—Timer 3=2 sec.; Compare Timer 3 with Timer 1, they are the same
STEP 5—Timer 3=2 sec.; Compare Timer 3 with Timer 1, they are the same
STEP 6—Timer 3=0.5 sec.; Compare Timer 3 with Timer 1, they are not the same
Compare Timer 3 with Timer 2, they are not the same
Save Timer 3 in Timer 1
Timer 1=0.5 sec.
Timer 2=2 sec.
STEP 7—Timer 3=0.5 sec.; Compare Timer 3 with Timer 1, they are the same
STEP 8—Timer 3=0.5 sec.; Compare Timer 3 with Timer 1, they are the same The system will continue checking the same sequence and it will be assumed that the call has not been answered.

SECOND EXAMPLE

Call to Malta - Ring Back Followed By Voice

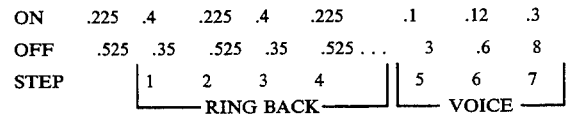

STEP 1—Timer 1=0.4 sec.
STEP 2—Timer 2=0.225 sec.
STEP 3—Timer 3=0.4 sec.; Compare Timer 3 with Timer 1, they are the same
STEP 4—Timer 3=0.225 sec.; Compare Timer 3 with Timer 1, they are not the same
Compare Timer 3 with Timer 2, they are the same The system will continue checking the same sequence assuming that the call has not been answered. When the called party answers the call, (5) the following sequence will be followed.
STEP 5—Timer 3=0.1 sec.; Compare Timer 3 with Timer 1, they are not the same.
Compare Timer 3 with Timer 2, they are not the same.
Timer 3 will be saved in Timer 1.
Timer 1=0.1 sec.
Timer 2=0.225 sec.
STEP 6—Timer 3=0.12 sec., Compare Timer 3 with Timer 1, they are not the same.
Compare Timer 3 with Timer 2, they are not the same. The Timer 3 will be saved in Timer 2.
Timer 1=0.1 sec.
Timer 2=0.12 sec.
STEP 7—Timer 3=0.3 sec. Compare Timer 3 with Timer 1 they are not the same.
Compare Timer 3 with Timer 2, they are not the same. The system detects that the call has been answered.

Figure 5:
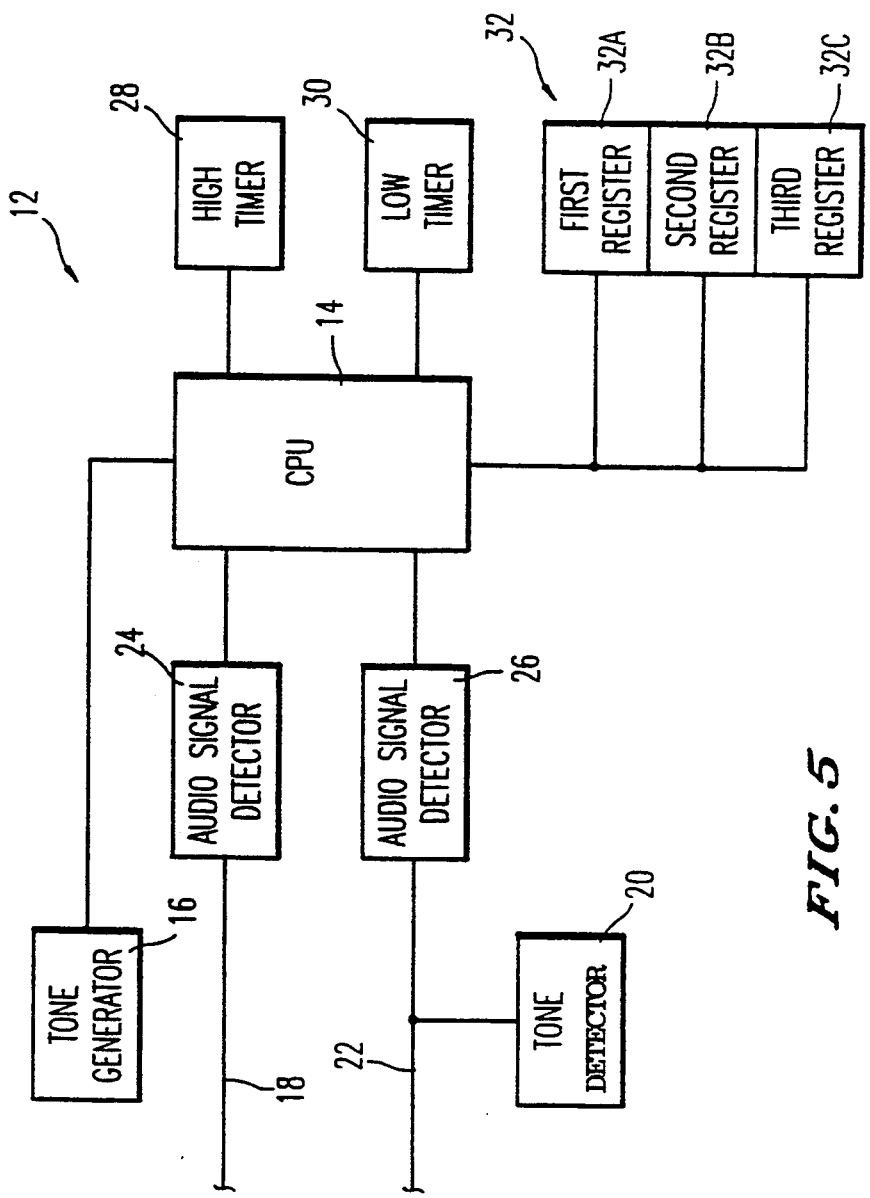
FIG. 5 is a schematic diagram illustrating one embodiment of an apparatus for performing the answer supervision method of the present invention.

FIG. 5 illustrates one embodiment of an apparatus for performing the above described answer supervision of the method of the present invention. The apparatus, generally indicated at 12, comprises a CPU 14 which is appropriately programmed to perform the above described method steps. Connected to the CPU 14 is a tone generator 16, which is activated by the CPU 14 to generate the 2,100 Hz tone employed by the tone answer supervision, the tone generator 16 being connected to a transmit line 18 of a telephone (not shown). A tone detector 20 is provided to detect the return of the transmitted tone, the tone detector being connected to the receive line 22 of the telephone (not shown) as well as the CPU 14.

A transmit line audio signal detector 24 is provided for detecting audio activity on the transmit line 18, and a receive line audio signal detector 26 is provided for detecting audio activity on the receive line 22, each of the audio detectors 24, 26 being connected to the CPU 14. Also connected to the CPU 14 are a high timer 28 for measuring the duration of audio activity detected on either the transmit or receive lines 18, 22 as well as a low timer 30 for measuring the duration of no audio activity on lines 18, 22. A memory storage arrangement, generally indicated at 32, is connected to the CPU 14 and includes a first register 32 A, or the like, for storing a first timer duration measurement, a second register 32 B, or the like, for storing a second timer duration measurement, and a third register 32 C, or the like, for storing a third timer duration measurement.

Figure 6:
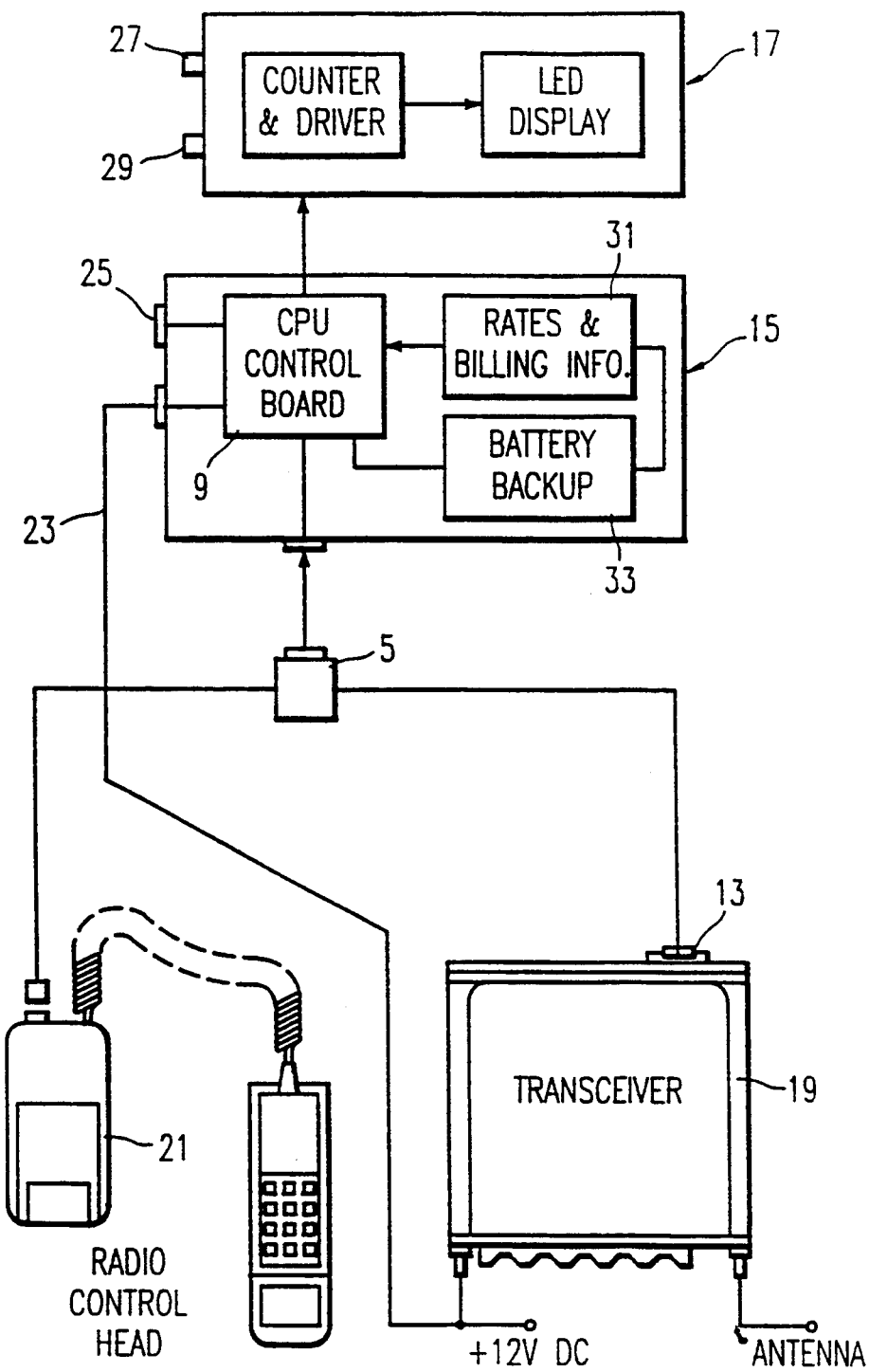
FIG. 6 is a schematic diagram illustrating one embodiment of an autonomous pay telephone arrangement of the present invention as retrofitted to a mobile telephone.

Because it is essential that an autonomous pay telephone arrangement correctly recognize the answering of a call, the call answer supervision method and apparatus described above, which can be universally applied to any telephone, mobile or otherwise, for use in answer supervision to detect the completion of local, national, and international calls routed through different communication media, are envisioned for use with the autonomous pay telephone arrangement to be described in detail hereinafter with particular reference to FIG. 6.

FIG. 6 illustrates one embodiment of the autonomous pay telephone arrangement of the present invention, generally indicated at 11, as applied to a mobile telephone generally indicated at 13. In this particular embodiment of the present invention, the autonomous pay telephone arrangement 11 is adapted to be retrofitted to any standard mobile telephone arrangement. However, it should be understood that the autonomous pay telephone arrangement of the present invention can be easily incorporated into any telephone, mobile or otherwise, during its manufacture so as to create a dedicated stand alone, pay telephone—Depending on the needs of the owner of such a dedicated stand alone pay telephone, programming of call supervision can be tailored as needed, such as, for example, to require payment in advance of call placement, or afterwards, as discussed hereinafter.

A mobile telephone, as used herein, is defined as a communication device for reproducing sounds at a distance which is capable of being moved, such as, for example, a cellular telephone, a radio telephone and other communication devices for communicating with telephones connected to landlines and/or other mobile telephones, and has a source of power which permits a substantially unrestricted transport of the mobile telephone, such as, for example, a portable battery or the like. Stationary telephone, as used hereinafter, is a device for reproducing sounds at a distance, specifically one which converts sound into electrical impulses for transmission over telephone wires, which due to its direct connection to the telephone wires, lack of a mobile power source, or for any other reason, is fixed at a given station.

The arrangement 11 includes an appropriately programmed CPU control board 9 contained in, for example, a cabinet 15, the CPU control board 9 being connected to a display 17, a transceiver 19 of the mobile phone 13, a hand-set 21 of the mobile telephone 13 as well as to a power source (not shown) via a power cable 23. The connection of the CPU control board 9 to the mobile telephone 13 is accomplished via a communication control circuit (not shown) comprising dedicated hardware and software, as is known in the art, which permits the transmission and receipt of control signals between the arrangement 11 and the specific mobile telephone 13 using, for example, a parallel cable 5. Preferably, the display 17 has, for example, an LED display as well as a counter and driver.

The CPU control board 9 is provided with a computer access port 25 for connecting the CPU control board 9 to a pluggable outboard PC computer which permits, through use of various passwords, programming of all programmable parameters such as bill rates and tariffs as well as appropriate access to charge and accounting information. Alternatively, programming of the arrangement 11 can be performed via the keypad of the telephone hand-set 21 and the LED display of display 17.

When the arrangement 11 is applied to a mobile telephone located in a land based vehicle, such as, for example, a taxi rental car or bus, the power source comprises a standard 12 volt DC battery. The display 17 includes both a reset button 27 as well as a SET button 29. When the display 17 is an LED display, high visibility is provided for reading both during day and night. Additionally, the reset button 27 returns the readout of the display 17 to its default display of 000.00 when depressed. If the reset button 27 is not depressed, it will continue to add to the cost of the previous call, allowing for computation of the total amount of successive calls made by a single user.

The CPU control board 9 is connected to a static random access memory (RAM) 31 which is protected by a back-up battery 33 to prevent loss of stored information in the event of a power outage. The memory 31 stores billing rates for services to be provided, such as local and long distance rate charges, incoming and outgoing precharges, tariffs, mark-ups and the like as well as accounting information for services provided.

A stack of, for example, four memory locations are provided by the memory 31 for storing accounting information. These four memory locations include: 1) total amount accumulated since the last system reset, i.e., the sum of all the current periods, 2) last current period, 3) current period, i.e., this is the current period since period reset (sum of all current rides for a given working shift), and 4) total for the current ride which includes the sum of all charges since the counter reset, the current ride being defined as the total displayed on the display.

Thus, the accounting information stored by the internal memory 31 includes the total amount of money charged by the arrangement 11 since its last internal reset, which is done, for example, via the portable computer connected to port 25 or from the hand-set 21 using special commands. This allows the owner of the autonomous pay telephone arrangement 11 to have an exact total of the money collected by the driver of, for example a taxi or bus, at the end of each shift. Moreover, the total amount stored in the memory 31 is protected from unauthorized resetting by using appropriate security passwords.

The various password levels permit the authorized user to have access to read data, change data or perform options. According to the specific level of the password provided, the user will be able to change passwords, change tariffs, pre-charges and charges, assign or unassign a particular autonomous pay telephone arrangement 11 to a particular transceiver 19 so that the arrangement will work only with its assigned transceiver to prevent unauthorized use, reset the system, examine money account accumulation, program mark-ups and perform programmable options as provided.

Options which can be provided by suitably programming the CPU control board 9 include incoming call enable which will enable or disenable incoming calls as the operator deems necessary. In this regard, if the incoming call feature of the arrangement 11 has been disenabled, the transceiver 19 will be turned off upon receipt of an unauthorized incoming call. Further options include charge call enable which will enable or disenable the money charge for incoming calls if the incoming call enable has been activated. In this regard, a push to charge button (29) is provided which enables the incoming call charge if the operator needs to screen the incoming calls before deciding whether or not to charge his customer.

Additionally, the arrangement 11 can be programmed to allow the operator to input a total of, for example, 10 no charge numbers, outgoing only, such as for example, emergency telephone numbers or work related telephone numbers. Additionally, call restriction can be provided to restrict local, long-distance, international, operated assisted calls or calls by the central office identification or NNX code. The country of operator's dialing plan can also be preprogrammed so that the arrangement 11 can be taken from country to country to operate locally. In this regard, local and long distance rate tables are downloaded from the external computer via port 25 so that the arrangement 11 will accurately calculate charges according to the local rate table configuration. Also included in the billing scheme is a roaming fee which can be altered to conform to the area's roaming requirements.

The CPU control board 9 is also preferable programmed so that the arrangement 11 constantly verifies memory circuits to certify normal operation. Any malfunction detected will cause the unit to cease to operate and a malfunction message will appear at the hand-set.

Thus, in the preferred embodiment, the arrangement 11 is a software controlled, full feature mobile phone add on which includes a metering device for worldwide use which shows, in local currency, the amount of money due to the owner or operator of the autonomous pay telephone arrangement for calls made from the mobile phone 13 attached to the arrangement 11. It is designed to meter calls which may be local, long-distance, international, incoming or outgoing.

This equipment allows the owners and users of mobile telephones, such as for example, cellular telephones, to monitor the cost of calls placed or received, in a real-time basis. The owner or user does not have to wait until the call is completed or until the bill comes in a month later to find out how much the cost of the call was.

The arrangement 11 is easy to use and requires no driver interference or assistance. In the case of a taxi, the handset is installed in the back of the front seat to allow easy access by the passenger. A second hand-set can also be installed next to the passenger seat. The need satisfied by the autonomous pay telephone arrangement 11 is the ability to communicate at all times. The passenger who arrives at the airport and wants to call the office or the person who is late to an appointment can use the autonomous pay telephone arrangement to call ahead. Also, the person who rents a car and needs to make a call can also use this unit if so provided by the rental company.

The particular problem that the autonomous pay telephone 11 overcomes is the method of metering the call and providing an indication of how much is owed immediately. This is particularly important to the taxi driver who may never see the rider again. Money is collected in cash, another advantage to the taxi owner and can be used by anyone that rides a taxi and has the required cash on hand so as to eliminate the need for credit cards or a particular debit or calling card.

By being able to control the tariffs, i.e., charges, the taxi owner or pay telephone owner provider can establish the desired mark-up without having to depend on others. Further, the static memory 31 provides for a method of maintaining accounting information that meets the particular needs for auditing taxi ride money collected related to the use of the autonomous pay telephone arrangement 11.

In the case of rental cars, the use of the autonomous pay telephone arrangement 11 permits immediate pricing of calls made on a real-time basis. This is advantageous to the person renting the car since such calls are normally made at a premium and by knowing how much he has been charged prior to returning the call there will be no disputes relating to the rental bill.

In operation, to generate an outgoing call, the telephone number is dialed from the hand-set 21, and the send button 29 is depressed to generate a send signal. Thereafter, the autonomous pay telephone arrangement 11 validates the number and assigns the appropriate rate charge in accordance with charge data stored in the memory 31. After confirmation that the call has been answered, in accordance with the unique and novel call answer supervision method to be described in detail hereinafter, the autonomous pay telephone arrangement 11 starts to send the charges to the display 17 until the called party or the calling party ends the call. The number called, the time and date, total charge and other desired parameters are saved in the memory 31 for reference in a memory updating process conducted upon completion of the outgoing call.

When the autonomous pay telephone arrangement 11 detects an incoming call, the CPU control board 9 refers to the memory 31 to determine if incoming calls are allowed. If incoming calls are not allowed, the autonomous pay telephone arrangement 11 turns off the transceiver 19. However, if incoming calls are permitted, the arrangement 11 waits until the call is answered and thereafter, immediately starts to charge for the call upon answering or alternatively, when a push to charge button (29) is depressed, so that the operator of the autonomous pay telephone arrangement can determine if charges for the call should be accessed. As with outgoing calls, upon completion of each of the incoming calls, total charges for each of the incoming calls are also saved for further reference during a memory updating process conducted upon completion of the incoming call.

The autonomous pay telephone arrangement can be provided options for operation with any type of full duplex conventional and trunked radios, and radio telephone transceivers including cellular transceivers compatible with the cellular format such as: AMPS, NMT 450, NMT 900, TACS, E-TACS as well as with options for interpreting the tariffing signals, in the case of some NMT systems and in E-TACS systems, normally sent by the mobile telephone switch (MTX) applying the corresponding call rate charge. In this regard, the AMPS cellular protocol does not contemplate any signalling from the MTX to the cellular telephone for either answer supervision or tariffing purposes. Due to this, the answer supervision method of the present invention is preferred for use with the autonomous pay telephone. In the case of NMT protocol, it contemplates in its specification the possibility of incorporating a known answer supervision and tariffing scheme called Q1,Q1 which utilizes Fast Frequency Shift Key (FFSK). However, in most countries, this feature is not activated and the NMT system is thus the same as the AMPS as discussed above. The TACS systems do not employ such a signalling scheme. The E-TACS systems employ answer supervision and tariffing signaling to the mobile unit as a standard feature.

Thus, when the MTX sends an answer supervision signal and/or tariffing signal(s), then the answer supervision of the present invention is not required and the standard means for detecting these answer supervision signal and/or tariffing signal(s) is employed. The autonomous pay telephone of the present invention would then detect such signals from the MTX and either commence the tariffing based on a pre-set tariff table (if only answer supervision signaling is sent) or interpret the tariff signals and apply the appropriate mark-up for the on-line charge display (if tariff signals are sent).

Obviously, numerous modifications and variations of the present invention are possible in light of the above teachings. It is therefore to be understood that within the scope of the appended claims, the invention may be practiced otherwise than as specifically describe above.

What is claimed as new and desired to be secured by Letters Patent of the United States is:

1. An arrangement for connection to a mobile full duplex radio including handset means for placing and receiving a telephone call and transceiver means coupled to said handset means via a communicaiton line for transceiver calls placed and received by said handset means, for providing a mobile autonomous pay telephone, comprising:

a memory for storing charge information including at least outgoing call rate information for setting a rate to be charged, per unit of time, for an outgoing call to a given telephone number;

charging determining means coupled to said communication line for receiving the telephone given number and for determining a charge for the call based on at least the rate to be charged for the outgoing call placed to the given number from at least the outgoing call rate information stored in the memory;

metering means for accessing, in real-time, as a call progresses, the charge for the call as determined by the charge determining means utilizing at least the outgoing call rate information;

display means for displaying, in real-time as the call progresses, charges accessed by the metering means for the call placed to the given telephone number;

call answer supervision means for determining when a call has been answered by a called party;

said call answer supervision means comprising:

tone generating means for transmitting a tone of a given frequency on a transmit line of a mobile full duplex radio;

tone detection means for monitoring a receive line of a mobile full duplex radio and the determining if the tone is received back on the receive line;

audio activity detection means for simultaneously monitoring the transmit and receive lines for the presence of audio activity;

cadence determining means for determining if the audio activity, present on at least one of the transmit and receive lines, has a repetitive cadence; and answer confirmation means for determining that the placed call has been answered if at least one of the following conditions occurs;

1) the tone of the given frequency is detected as received back on the receive line by the tone detecting means; and 2) audio activity having an irregular pattern is detected both on the transmit and receive lines of a mobile full duplex radio by the cadence determining means.

2. An arrangement according to claim 1, wherein the metering means includes means for accessing the charges for the call only if the call answer supervision means determines that the call has been answered by the called party.

3. An arrangement according to claim 1, further comprising accounting means for storing, in the memory, accounting information including at least a total charge accessed by the metering means for each competed telephone call.

4. An arrangement according to claim 3, further comprising an output port means for outputting the accounting information, from the memory, including the total charge accessed by the metering means for each completed telephone call.

5. An arrangement according to claim 4, wherein the accounting means includes means for storing the total charges assessed by the metering means for each completed telephone call for a given period of time.

6. An arrangement according to claim 1, further comprising input port means for inputting, to the memory, the charge information for storage in the memory.

7. An arrangement according to claim 1, further comprising interface means for interfacing the arrangement with a mobile telephone.

8. An arrangement according to claim 1, wherein the display means is an light emitting diode display.

9. An arrangement according to claim 1, further including a reset means for resetting the display means.

10. An arrangement according to claim 1, wherein the memory means is a random access memory.

11. An arrangement according to claim 9, further comprising a back-up battery for maintain the charge information and accounting information in the memory in the event of a power outage.

12. An arrangement according to claim 1, further comprising means for supplying power to the arrangement from a 12 volt battery.

13. An arrangement according to claim 1; wherein said cadence determining means comprises detection means for detecting a regular cadence on the receive line to indicate that the call is being processed and for detecting an irregular cadence in both the transmit and receive lines to confirm that the cell has been answered.

14. An arrangement according to claim 1, wherein the charge information stored in the memory further includes at least an incoming call rate for setting charges to be accessed for incoming calls received and wherein the charging determining further includes means for determining the rate to be charge for a received incoming call from the incoming all rate information stored in the memory.

* * * * *